United States Patent
Inoue

[11] 3,722,989
[45] Mar. 27, 1973

[54] CONTROL DEVICE FOR MOTOR DRIVEN MOTION PICTURE CAMERA

[75] Inventor: Yoshimitsu Inoue, Osaka, Japan

[73] Assignee: Minolta Camera Kabushika Kaisha, Osaka-fu, Japan

[22] Filed: June 30, 1971

[21] Appl. No.: 158,206

[30] Foreign Application Priority Data

June 30, 1971 Japan....................45/57139

[52] U.S. Cl..................352/137, 352/121, 352/169, 352/177
[51] Int. Cl..............................................G03b 19/18
[58] Field of Search......352/137, 169, 174, 176, 177, 352/121; 95/59

[56] References Cited

UNITED STATES PATENTS

| | | | |
|---|---|---|---|
| 3,520,598 | 7/1970 | Murata | 352/137 X |
| 745,272 | 11/1903 | Bornmann | 95/59 |
| 1,033,524 | 7/1912 | Bornmann | 95/59 |
| 1,676,529 | 7/1928 | Cuendet | 95/59 |
| 3,598,480 | 8/1971 | Kubota | 352/169 |

Primary Examiner—Samuel S. Matthews
Assistant Examiner—Monroe H. Hayes
Attorney—Watson, Cole, Grindle & Watson

[57] ABSTRACT

A motion picture camera is provided with controls for selectively taking motion picture sequences or still shots. The exposure of the still shots may be selected by controlling the open period of the shutter. In this way bulb exposures may be made.

5 Claims, 8 Drawing Figures

PATENTED MAR 27 1973　　3,722,989

INVENTOR.
YOSHIMITSU INOUE

BY
WATSON COLE GRINDLE & WATSON

ATTORNEYS

CONTROL DEVICE FOR MOTOR DRIVEN MOTION PICTURE CAMERA

BACKGROUND OF THE INVENTION

The present invention relates to a one frame shot photographic device in a motor driven motion picture camera, and more particularly relates to a motor driven motion picture camera for enabling to effect not only an instant exposure of a definite shutter speed, but also a long time exposure owing to a bulb exposure especially when an object is dark in the one frame shot photographing.

In the prior art, a motor driven motion picture camera changeable over to the continuous shooting and the one frame shot photographing have been known, however, the shutter speed for the one frame shot photographing in such a motor driven motion picture camera is the same definite shutter speed as the shutter speed for the continuous photographing.

Therefore, in the case of that an object is dark and a proper exposure can not be obtained even though the aperture is fully opened, the photographing is required to be carried out by lighting up the object by means of an artificial lighting source. This fact necessitates first an artificial lighting source, if said source is not available the photographing cannot help being given up, and in the case of that over-heating the object effected by an artificial lighting source is not desirable to the object the photographing becomes impossible.

Whereas, in the case of that an object is still dark even though the aperture of the camera is fully opened, provided the shutter speed can be set up so as to effect an optional long time exposure, the one frame shot photographing can be effected even for a dark object in a certain extent.

OBJECT OF THE PRESENT INVENTION

One object of the present invention is to provide a motor driven motion picture camera for enabling to effect a one frame shot photographing by changing over the shutter speed to the bulb exposure to a dark object as described above.

Another object of the present invention is to provide a motor driven motion picture camera changeable over to the continuous shooting, the one frame shot photographing which shutter speed is the same as the shutter speed in said continuous photographing, and the one frame shot photographing of a long time exposure owing to the bulb exposure.

Further another object of the present invention is to provide a motor driven motion picture camera which motor circuit is opened to prevent an over-load to the motor even though the release member is brought about to the release operation during exposure in the one frame shot photographing of a long time exposure.

Still further another object of the present invention is to provide a shutter mechanism in a motor driven motion picture camera so formed that when the motor driven motion picture camera is changed over to the one frame shot photographing of a long time exposure the exposure is started in connection with the release operation of the release member and the exposure is finished in connection with the terminating of the release operation.

The other objects of the present invention will be cleared in the detailed description of the present invention disclosed hereinafter.

SUMMARY OF THE INVENTION

In order to attain the objects mentioned above, the present invention relates to in a motor driven motion picture camera changeable over to the continuous shooting and the one frame shot photographing, which is provided with a rotary shutter blade driven by a motor, a rotary stopper on the same spindle as to said rotary shutter blade, a restraining lever having a motor circuit switch for restraining the rotation of said rotary stopper, an electromagnet for actuating said restraining lever to release the restraint of said rotary stopper and close the motor circuit, and a release member for switching a power source circuit for giving an exciting current to said electromagnet, a motor driven motion picture camera so formed that an exposure retaining lever for restraining said rotary stopper in the opening state in connection with a change over lever, and said restraining lever are connected by an intermediate member, and when said change over lever is changed over to the bulb exposure side said exposure retaining lever restrains said rotary stopper in the shutter opening state in interlocking with releasing the restraint of said restraining lever effected by the electromagnet through the release operation of the release member, and the switch is opened to stop once the motor; and when said exposure retaining lever released from the electromagnet simultaneously with the end of the release operation comes into contact with said rotary stopper the restraint of said rotary stopper effected by said exposure retaining lever through said connecting projection is released and the switch is closed to close the motor circuit, and when said restraining lever restrains said rotary stopper the motor switch on said restraining lever is opened to effect the one frame photographing owing to a bulb exposure.

DESCRIPTION OF THE PREFERRED EMBODIMENT

Figure 1:
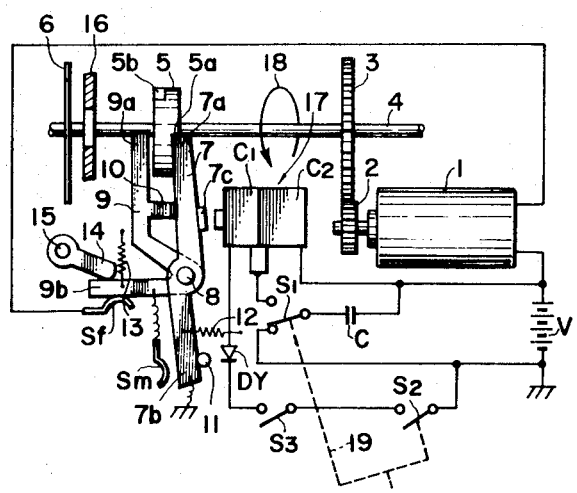
FIG. 1 is side view showing the essential portion of an embodiment of the motor driven motion picture camera in accordance with the present invention.
Figure 2:
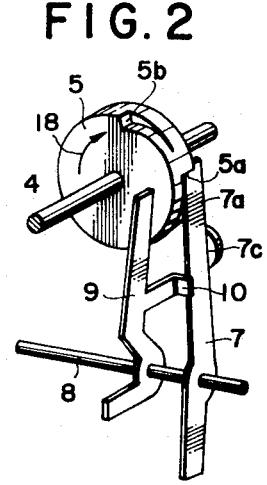
FIG. 2 is a perspective view showing the partial formation of the rotary stopper, the restraining lever and the exposure retaining lever in said embodiment shown in FIG. 1.

FIG. 1 shows an embodiment of the essential portion in accordance with the present invention, wherein rotary shutter blade 6 provided in front of aperture 16 to open and close said aperture 16 is fixed to spindle 4 supported on the camera body and journalled so as to rotate to the direction shown by arrow 18 by means of motor 1 through gears 3, 2, and to said spindle 4 rotary stopper 5 is fixed. On said rotary stopper 5 there are formed notch 5a to function as a stop member on the rear face thereof and notch 5b of the same kind on the surface thereof, and said both notches 5a, 5b have respectively a phase slipped off 90° relative to spindle 4.

Restraining edge 7a on the tip of one arm of restraining lever 7 supported turnably by pin 8 and given the counterclockwise turning tendency in FIG. 1 by spring 12 is in contact with the outside edge of the back of rotary stopper 5, and when said rotary stopper 5 turns to the direction shown by arrow 18 said restraining edge 7a engages with said notch 5a as shown in FIG. 1 (FIG. 3A) to restrain the turning of said rotary stopper 5. And, to the arm of said restraining lever 7 there is fixed armature 7c facing electromagnet 17 described later and the other arm thereof is always earthed to constitute contact piece 7b for motor circuit switch Sm and in contact with stop pin 11 in the state shown in FIG. 1.

In the same way, also on the tip of one arm of exposure retaining lever 9 supported turnably by pin 8 and given the clockwise turning tendency in FIG. 1 by weak spring 13 there is formed restraining edge 9a engageable with notch 5b of said rotary stopper 5, and on said arm there is formed connecting projection 10 projecting toward said restraining lever 7, and on the other arm 9b there is formed a contact piece for switch Sf connected in the motor circuit.

Change over lever 14 supported by pin 15 to come into contact with said arm 9b, when it is turned clockwise, turns said exposure retaining lever 9 counter-clockwise against spring 13 and restrains it, so as to retreat restraining edge 9a thereof from the surface of rotary stopper 5, and when said change over lever 14 is turned counter-clockwise said restraint is released.

Electromagnet 17 is formed by two coils $C_1$, $C_2$ connected in series, and one coil $C_2$ is excited when the charging voltage of capacitor C connected to electric power source V via switch $S_1$ is discharged, and both coils $C_1$, $C_2$ are connected to electric power source V via change over keying switch $S_3$ to operate the continuous shooting or the one frame photographing and release switch $S_2$ connected in series to said switch $S_3$. That is, when both switches $S_2$, $S_3$ are closed both coils $C_1$, $C_2$ are excited by the current from power source corresponding to the impedance thereof, and the opening/closing of said release switch $S_2$ and the change over to of said charge and discharge switch $S_1$ are interlocking with interlocking member 19. And, rectifier Dy is in preventing the reverse current of electric current.

The circuit for motor 1 is started from electric power source V, and passing through motor 1 switch Sf, arm 9b, switch Sm, contact piece 7b, and the earth in order returned to said electric power source V, and when switches Sf, Sm are both closed, motor 1 is rotated to drive spindle 4.

Since the present invention is formed as described above, when the continuous shooting is performed arm 9b of exposure retaining lever 9 is restrained against spring 13 by change over lever 14 as shown in FIG. 1 to close change over switch $S_3$. In this state, switch $S_1$ is on the charging side and capacitor C is charged.

And, when released switch $S_2$ is closed through the release operation switch $S_1$ is changed over to the discharge side by interlocking member 19, and by coil $C_2$ excited by the discharging current armature 7c of restraining lever 7 is actuated by electromagnet 17, and accordingly restraining edge 7a is disengaged from notch 5a of rotary stopper 5 and at the same time the current from electric power source V runs through coils $C_1$, $C_2$ connected in series to each other via change over switch $S_3$ closed and release switch $S_2$ to retain electromagnet 17 in the excited state and restraining lever in the adsorbed state.

On account of said operations, motor switch Sm is closed to close the motor circuit, and rotary shutter blade 6 and rotary stopper 5 are turned, and a film not shown in FIG. 1 also is driven to effect the continuous photographing. When the release operation is stopped electromagnet 17 is demagnetized and restraining edge 7a comes into contact with the rear face of rotary stopper 5, however, motor switch Sm is still closed so that motor 1 continues to rotate and rotary stopper 5 also continues to turn while being in contact with restraining edge 7a, and when notch 5a engages with restraining edge 7a motor switch Sm is opened and rotary stopper 5 is stopped.

Next, in the case of the normal one frame shot photographing, upon opening change over switch $S_3$ and closing release switch $S_2$ in this state, change over switch $S_1$ also is put on the discharge side via interlocking member 19 and accordingly electromagnet 17 is excited by the discharging current to attract restraining lever 7 and release the restraint of rotary stopper 5 and simultaneously close motor switch Sm, and thus shutter blade 6 is started to turn by motor 1.

On the other hand, the discharge of capacitor C is stopped in a short time and electromagnet 17 is demagnetized, and restraining lever 7 comes into contact with the rear face of rotary stopper 5 through spring 12, however, motor switch Sm is still in the closing state, so that motor 1 continues to rotate, and when rotary stopper 5 turns through one round notch 5a engages with restraining edge 7a to restrain said rotary stopper 5 to finish the one frame shot photographing.

Figure 3A:
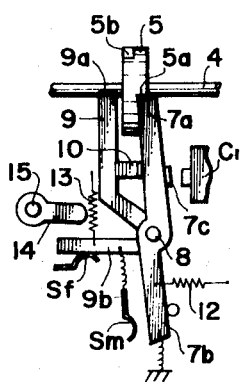
FIG. 3 is a side view showing the related formations of the rotary stopper, the restraining lever, the motor circuit switch thereof, the exposure retaining lever and the switch thereof in the case set up to the bulb exposure, wherein A shows the state prior to the release, B shows the state just after the release is effected and before the shutter is not fully opened yet, and D shows the state that the release operation is stopped and the shutter is closed, and the film is in course of winding.

Then, in the case of the one frame shot bulb photographing, by turning change over lever 14 counter-clockwise the restraint of exposure retaining lever 9 is released, and change over switch $S_3$ is closed. This state is shown in FIG. 3A. Said exposure retaining lever 9 tends to turn clockwise through spring 13, however, connecting projection 10 is in contact with restraining lever 7 and spring 13 is weaker than spring 12 so that said exposure retaining lever 9 is restrained instead of turning. And, rotary shutter blade 6 keeps aperture 16 closed as shown in FIG. 4.

Figure 3B:
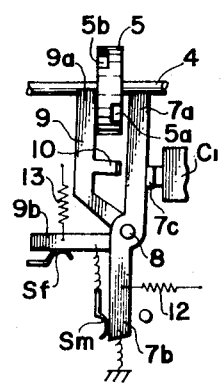
Figure 3C:
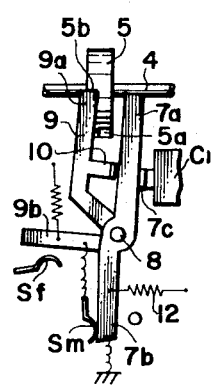
Figure 5:
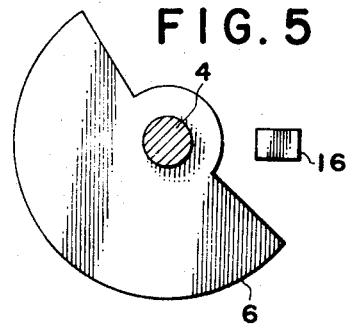
FIG. 5 is a front view showing the relation between the rotary shutter and the aperture in the state shown in FIG. 3C.

In this state, upon closing release switch $S_2$ electromagnet 17 is excited and restraining lever 7 is turned clockwise against spring 12, and accordingly armature 7c thereof comes into contact with electromagnet 17 and exposure retaining lever 9 also is turned clockwise following up said restraining lever 7, and stopped when restraining edge 9a thereof comes into contact with the surface of rotary stopper 5. That is, between connecting projection 10 and restraining lever 7 a clearance comes out as shown in FIG. 3B. And then, motor switch Sm is closed and switch Sf is held in the closing state, so that motor 1 starts to turn rotary stopper 5 and rotary shutter blade 6, and just as shown in FIG. 5 when said shutter blade 6 opens fully aperture 16 notch 5b engages with restraining edge 9a and said restraining edge 9a drops into said notch 5b through spring 13 to stop the turning of rotary stopper 5 as shown in FIG. 3C and simultaneously open switch Sf to stop the driving of motor 1. And connecting projection 10 comes into contact with restraining lever 7.

Figure 3D:
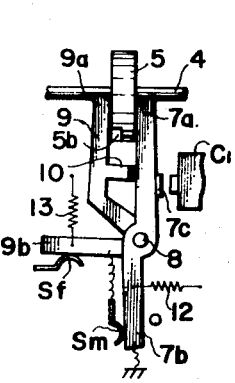
Figure 4:
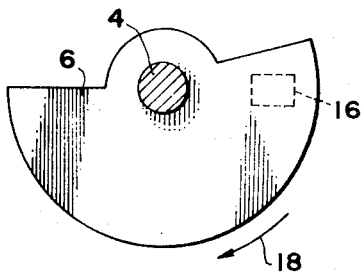
FIG. 4 is a front view showing the relation between the rotary shutter blade and the aperture in the state shown in FIG. 3A.

In this state, after the bulb exposure is given for a desired time, upon terminating the release lever release switch $S_2$ is opened and electromagnet is demagnetized to release the adsorption of armature 7c, so that restraining lever 7 is turned counter-clockwise by spring 12 until restraining edge 7a thereof comes into contact with rotary stopper 5 and at the same time exposure retaining lever 9 is turned to the same direction against spring 13 via connecting projection 10, and restraining edge 9a thereof disengaged from notch 5b as shown in FIG. 3D, however, motor switch Sm and switch Sf are still in the closing state, so that motor 1 continues to rotate and turns rotary shutter blade 6 and rotary stopper 5 from the state shown in FIG. 5 to close aperture 16 and at the same time take up the film as much as one frame portion as well known, and when turned to the state shown in FIG. 4 notch 5a engages with restraining edge 7a and said restraining edge 7a drops into said notch 5a to restrain rotary stopper 5 and simultaneously motor switch Sm is opened. And at the same time restraining edge 9a of exposure retaining lever 9 retreats thoroughly from rotary stopper 5 through connecting projection 10 to return to the state shown FIG. 3A and finish the one frame shot bulb photographing.

As described hereinbefore, in the present invention by means of change over lever 14 and change over switch $S_3$, three kinds of photographing — the continuous shooting, the one frame shot photographing of the instant exposure, and the one frame shot photographing of the bulb exposure — can be carried out by changing over.

What is claimed is:

1. A control device for a motor driven motion picture camera having a drive motor, a shutter blade, and a shutter driving shaft driven by said motor, a combination comprising:
   a plate member secured to said driving shaft for rotating therewith and having first and second stoppers;
   a first stop lever being biased to engage with said first stopper and stop said driving shaft at the position where said shutter blade is closed;
   a second stop lever being biased to engage with said second stopper and stop said driving shaft at the position where said shutter blade is opened;
   electromagnetic means for disengaging said first stop lever from said first stopper and holding the first stop lever at a retired position;
   an intermediate member for allowing said second stop lever to engage said second stopper only when said first stop lever is at the retired position;
   an exposure selecting member settable to a first position for restraining said second stop lever at a retired position and a second position for allowing the operation of the second stop lever;
   a first energizing circuit for energizing said driving motor;
   a second energizing circuit for energizing the electromagnetic coils, including a first and a second switch connected in series with each other, said first switch being closed with the camera being operated and said second switch being closed for continuous shooting and for bulb exposure and opened for single frame shooting; and
   a third energizing circuit for energizing said electromagnetic coil for a short time, and connected in parallel with said second energizing circuit.

2. A control device as set forth in claim 1, wherein said third energizing circuit includes a capacitor, discharge current of which runs through said electromagnetic coil.

3. A control device as set forth in claim 2, wherein said first energizing circuit includes third and forth switches connected in series with each other, said third switch being adapted to be opened to open the first energizing circuit with said first stop lever engaging with said first stopper, and said fourth switch being adapted to be opened to open said first energizing circuit with said second stop lever engaging with said second stopper.

4. A control device as set forth in claim 3, wherein said electromagnetic means includes a first and a second electromagnetic coil connected in series with each other, said second energizing circuit being connected to both end terminals of the series connection of said coils, and said capacitor being connectable across the second coil.

5. A control device as set forth in claim 4, wherein said plate member is a disk having two notches as said stoppers formed on the periphery thereof, each of said stop levers being slidable on a side face of the disk with the associated switch closed until the associated lever engages with the appropriate notch.

* * * * *